US 6,900,572 B2

(12) United States Patent
Omura

(10) Patent No.: US 6,900,572 B2
(45) Date of Patent: May 31, 2005

(54) STATOR OF ROTARY ELECTRIC MACHINE

(75) Inventor: Fumio Omura, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/869,890

(22) Filed: Jun. 18, 2004

(65) Prior Publication Data

US 2004/0256943 A1 Dec. 23, 2004

(30) Foreign Application Priority Data

Jun. 18, 2003 (JP) ......................................... 2003-172819

(51) Int. Cl.[7] ................................................ H02K 3/34
(52) U.S. Cl. ...................... 310/215; 310/260; 310/214
(58) Field of Search ................................. 310/215, 214, 310/260, 201, 208

(56) References Cited

U.S. PATENT DOCUMENTS 6,346,758 B1 * 2/2002 Nakamura ................. 310/217
6,400,056 B1 * 6/2002 Naka et al. ................. 310/215
6,609,289 B2 * 8/2003 Naka et al. ................... 29/596
6,674,211 B2 * 1/2004 Katou et al. ................ 310/215

FOREIGN PATENT DOCUMENTS

JP        A 2001-178057        6/2001

* cited by examiner

Primary Examiner—Dang Le
(74) Attorney, Agent, or Firm—Oliff & Berridge, PLC

(57) ABSTRACT

In a stator of a rotary electric machine, a stator winding is wound through slots of a stator core. The stator winding is constructed of conductor segments. Each of the conductor segments includes a slot inside portion held in the slot and a slot outside portion extending from the slot inside portion and located outside of the stator core. The slot outside portion is bent in a circumferential direction of the stator core. An insulating member is provided between an inner wall defining the slot and the conductor segments in the slot. The insulating member forms a deformed portion having the shape corresponding to a bent shape of the slot outside portion. Alternatively, the insulating member forms a deformed portion that is easily deformed when the conductor segments are bent and contact the insulating member.

12 Claims, 10 Drawing Sheets

STATOR OF ROTARY ELECTRIC MACHINE

CROSS REFERENCE TO RELATED APPLICATION

This application is based on Japanese Patent Application No. 2003-172819 filed on Jun. 18, 2003, the disclosure of which is incorporated herein by reference.

FIELD OF THE INVENTION

The present invention relates to a stator of a rotary electric machine such as an ac generator mounted in a vehicle.

BACKGROUND OF THE INVENTION

In a stator of an ac generator for a vehicle, an electrical insulating member is generally used to insulate a stator winding including electric conductors from a stator core. When the electric conductors are bent in a circumferential direction at an axial outside of the stator core to form the stator winding, an end of the insulating member is likely to be expanded and torn. To reduce such breakage of the insulating member, it is proposed to form slits at the end of the insulating member, for example, in Unexamined Japanese Patent Publication No. JP-A-2001-178057.

Since the slit is formed at the part of the insulating member, the end of the insulating member is not forcibly entirely expanded even when the electric conductors, which are arranged adjacent in a radial direction in a slot of the stator core, are bent in the circumferentially opposite direction. Because the insulating member is expanded only at a necessary portion, it is less likely that the end of the insulating member will be torn.

However, because a distance between the electric conductor and the stator core is reduced at the slit, the electric conductor and the stator core are likely to be short-circuited. Therefore, it is difficult to sufficiently maintain the electrical insulation between the electric conductors and the stator core. To improve the electrical insulation, it is conceived to shorten the slit. In this case, however, because the end of the slit is located axial outside of the axial end surface of the stator core, the insulating member will be easily torn at the end of the slit while bending the electric conductors. The short circuit between the electric conductors and the stator core is likely to cause abnormal power generation, resulting in deterioration of an environmental resistance.

SUMMARY OF THE INVENTION

The present invention is made in view of the foregoing matters, and it is an object of the present invention to provide a stator of a rotary electric machine capable of maintaining an electrical insulation between a stator winding and a stator core.

According to the present invention, a stator of a rotary electric machine has a stator core forming a plurality of slots, a stator winding wound through the slots of the stator core and an electrical insulating member. The stator winding is constructed of conductor segments. Each of the conductor segments has a slot inside portion held in the slot and a slot outside portion extending from the slot inside portion. The slot outside portion is located outside of the slot and bent in a circumferential direction of the stator core with a distance from the slot. The electrical insulating member is held in the slot in a form of loop between an inner wall defining the slot and the conductor segments. The end of the insulating member, which protrudes from an axial end surface of the stator core, forms a deformed portion. The deformed portion is deformable when the slot outside portion is bent and contacts the end of the insulating member.

Accordingly, even if the insulating member is expanded in the circumferential direction by bending the slot outside portion, the expansion is absorbed by the deformed portion since the deformed portion is deformed in the circumferential direction. Therefore, it is less likely that the insulating member will be torn and the conductor segment and the stator core will be short-circuited. Accordingly, the electrical insulation between the stator winding and the stator core is maintained. As a result, abnormal power generation and deterioration of environmental resistance are reduced.

Alternatively, the insulating member forms a deformed portion having the shape corresponding to the bent shape of the slot outside portion. Because the deformed portion is shaped before the slot outside portion is bent, it is less likely that the insulating member will be torn when bending the slot outside portion. Accordingly, the electrical insulation between the stator winding and the stator core are maintained.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
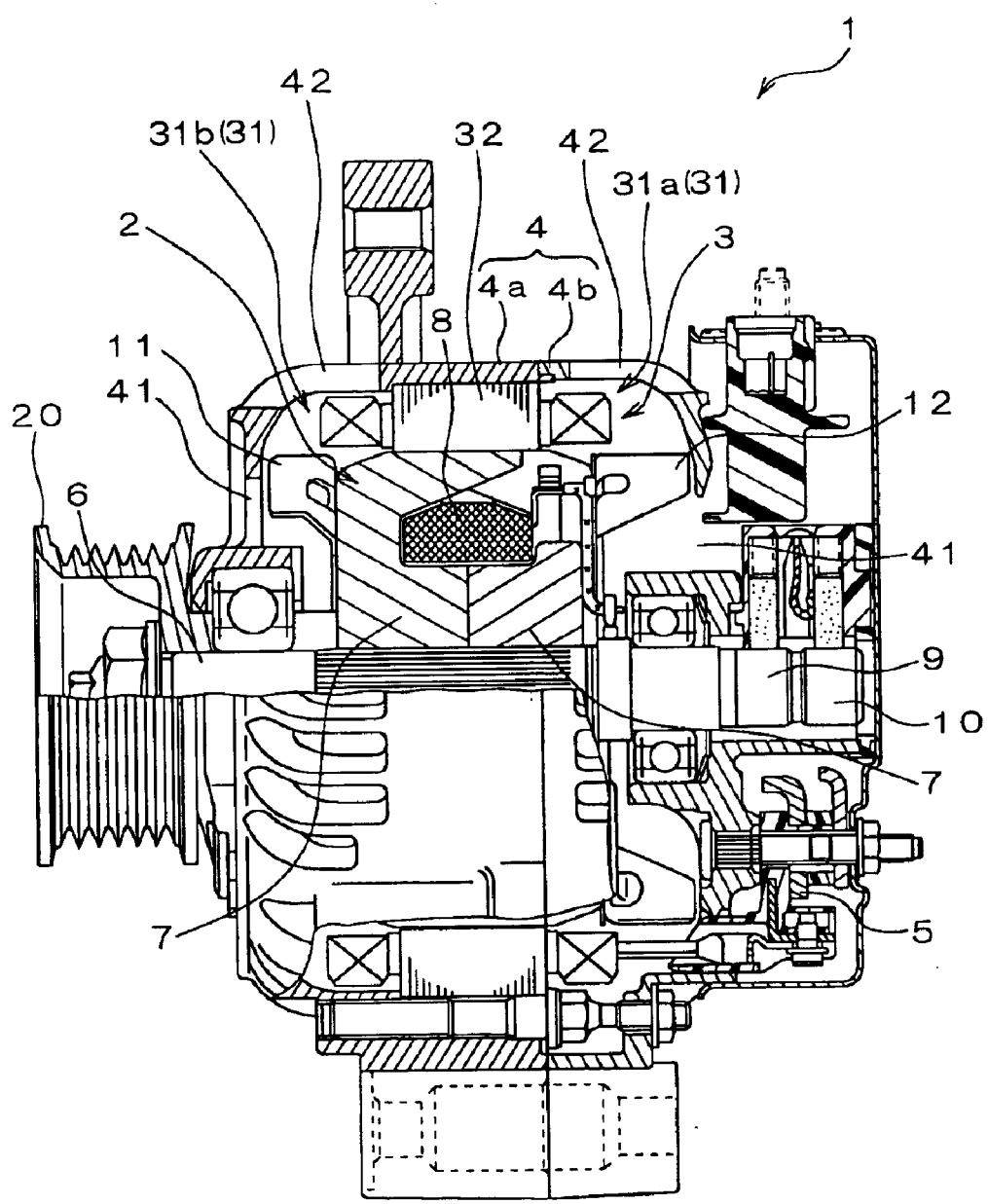
FIG. 1 is a schematic cross-sectional view of a vehicle ac generator according to an embodiment of the present invention.

Embodiments of the present invention will be described hereinafter with reference to the drawing.

Referring to FIG. 1, a vehicle ac generator 1 in which the present invention is employed has a rotor 2, a stator 3, a housing 4, a rectifier 5 and the like.

The rotor 2, which functions as a field, is disposed to rotate with a rotation shaft 6. The rotor 2 includes a Lundell-type pole core 7, a field coil 8, slip rings 9, 10. The rotor 2 further includes a mixed flow fan 11 and a centrifugal fan 12, as air blowing devices. The shaft 6 connects to a pulley 20, so the shaft 6 is rotated by an engine (not shown) mounted in a vehicle through a belt (not shown) and the pulley 20.

The housing 4 is constructed of a front housing 4a and a rear housing 4b. Each of the front housing 4a and the rear housing 4b forms air intake holes 41 on its axial end surface and air outlet holes 42 at its shoulder portions that correspond to radial outside of a first coil end 31a and a second coil end 31b of a stator coil 31.

The rectifier 5 rectifies ac voltage produced by the stator 3 into dc voltage. The rectifier 5 is located at an axial end of the vehicle ac generator 1 on a side opposite to the pulley 20.

Figure 2:
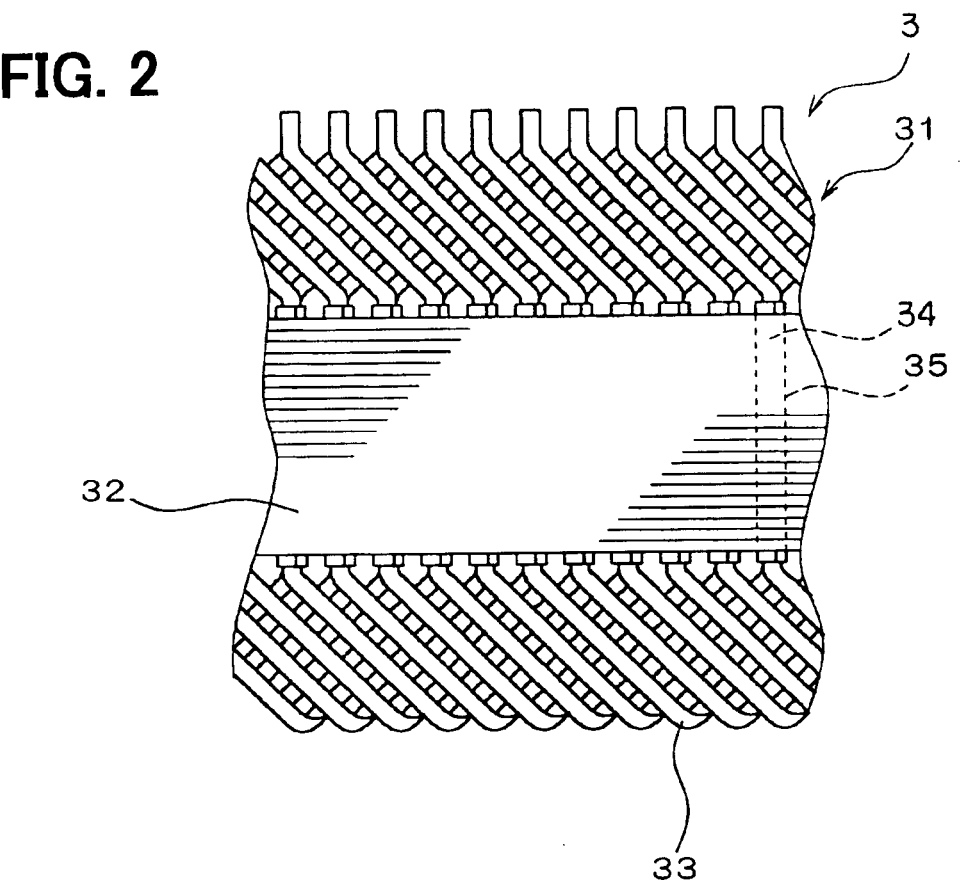
FIG. 2 is a development view of a stator of the vehicle ac generator, when viewed from an outside, according to the embodiment of the present invention.

The stator 3 includes a stator core 32, the stator winding 31 and insulators 34, as shown in FIG. 2. The stator core 32 is formed of a stack of thin steel plates. The stator core 32 forms a plurality of slots 35 on its inner diameter side. The stator winding 31 is wound through the slots 35. Further, the insulator 34 are arranged between the stator core 32 and the stator winding 31 as electrical insulating members.

Figure 4:
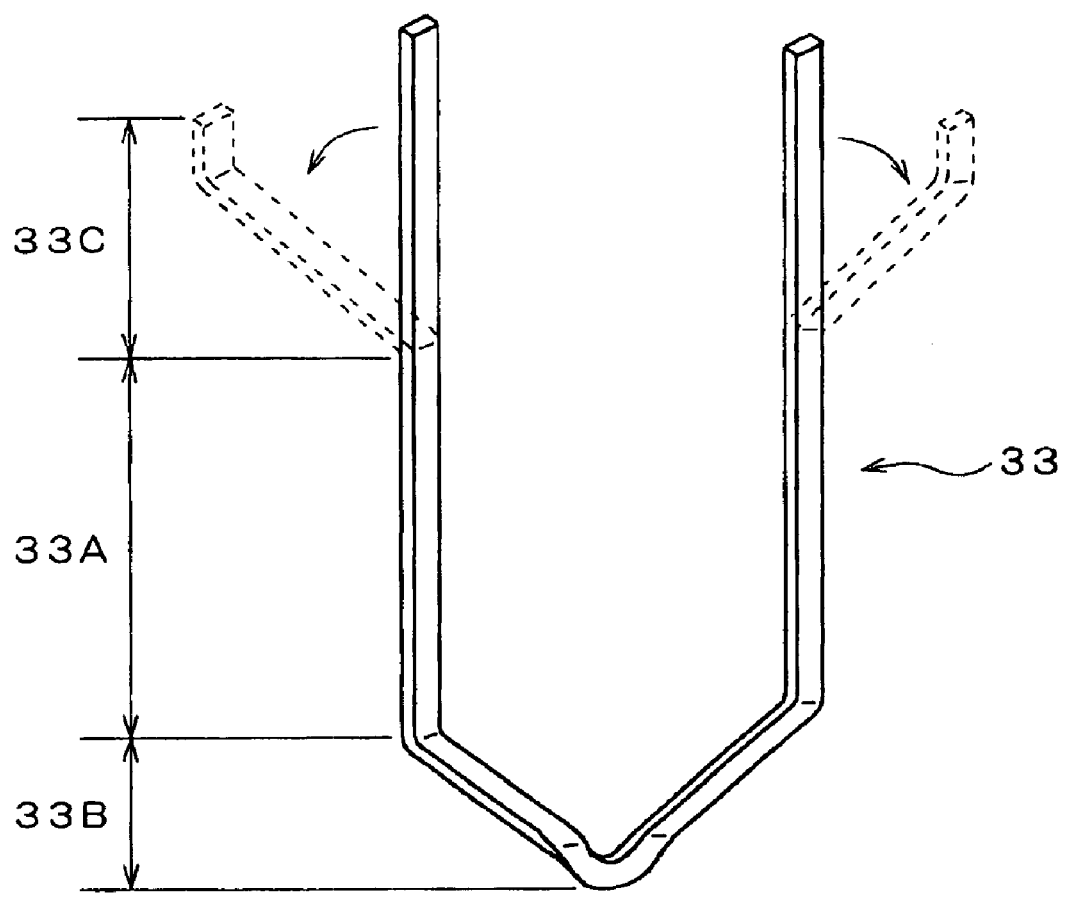
FIG. 4 is a perspective view of a conductor segment of the stator according to the embodiment of the present invention.

The stator winding 31 is constructed of a plurality of U-shaped conductor segments 33 shown in FIG. 4. Each of the conductor segments 33 has a first straight portion and a second straight portion. The conductor segment 33 are mounted in a manner that the first straight portion is inserted in one slot 35 and the second straight portion is inserted in another slot 35 that is predetermined pitch away. Further, the ends of the straight portions are bent in a circumferential direction of the stator core 32 up to predetermined positions, as shown by broken lines in FIG. 4. Furthermore, the ends of the straight portions are joined to adjoining ends of another conductor segments 33 in sequence, thereby forming multi-phase stator winding 31 shown in FIG. 2.

As shown in FIG. 4, each conductor segment 33 has slot inside portions 33A and slots outside portions 33B, 33C. The slot inside portions 33A are held in the slot 35. The slot outside portions 33B, 33C extend from the slot inside portions 33A. The slot outside portions 33B, 33C are located at the axial outside of the slot 35 and bent in the circumferential direction with the distance from the slot 35. The conductor segments 33 having the shape shown in FIG. 4 are arranged in the slots 35 in the radial direction and wound around the stator core 32 in the above manner, thereby constructing the stator winding 31.

Figure 7:
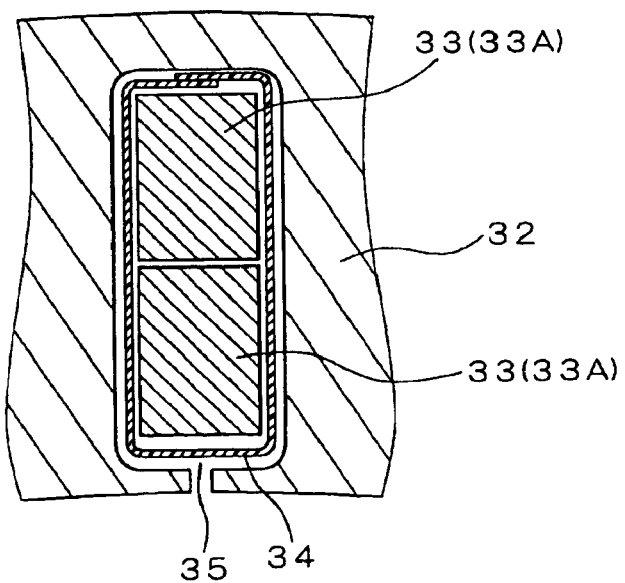
FIG. 7 is a cross-sectional view of the stator shown in FIG. 6 taken along a line VII—VII.

Each slot inside portion held in the slot 35 is grasped as a single electric conductor. As shown in FIG. 7, an even number of electric conductors (two in the embodiment) are held in each slot 35. Specifically, in one slot 35, the slot inside portions 33A are arranged in row in the radial direction. The slot inside portion 33A located adjacent to an inner diameter of the stator core 32 forms an inner layer and the other slot inside portion 33A located adjacent to an outer diameter of the stator core 32 forms an outer layer. Each of the insulators 34 is arranged along an inner wall that defines the slot 35, that is, between the inner wall of the slot 35 and the slot inside portions 33A. So, the insulator 34 is arranged to entirely surround the slot inside portions 33A in the slot 35. Also, each conductor segment 33, including the slot inside portions 33A and the slot outside portions 33B, 33C, is coated with an insulating coating made of such as polyamideimid.

Figure 3:
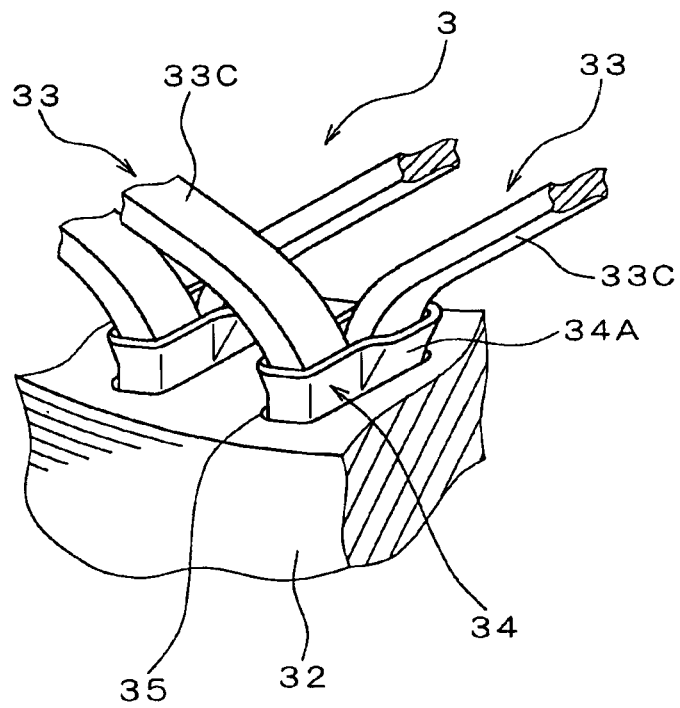
FIG. 3 is a partial perspective view of the stator according to the embodiment of the present invention.
Figure 5A:
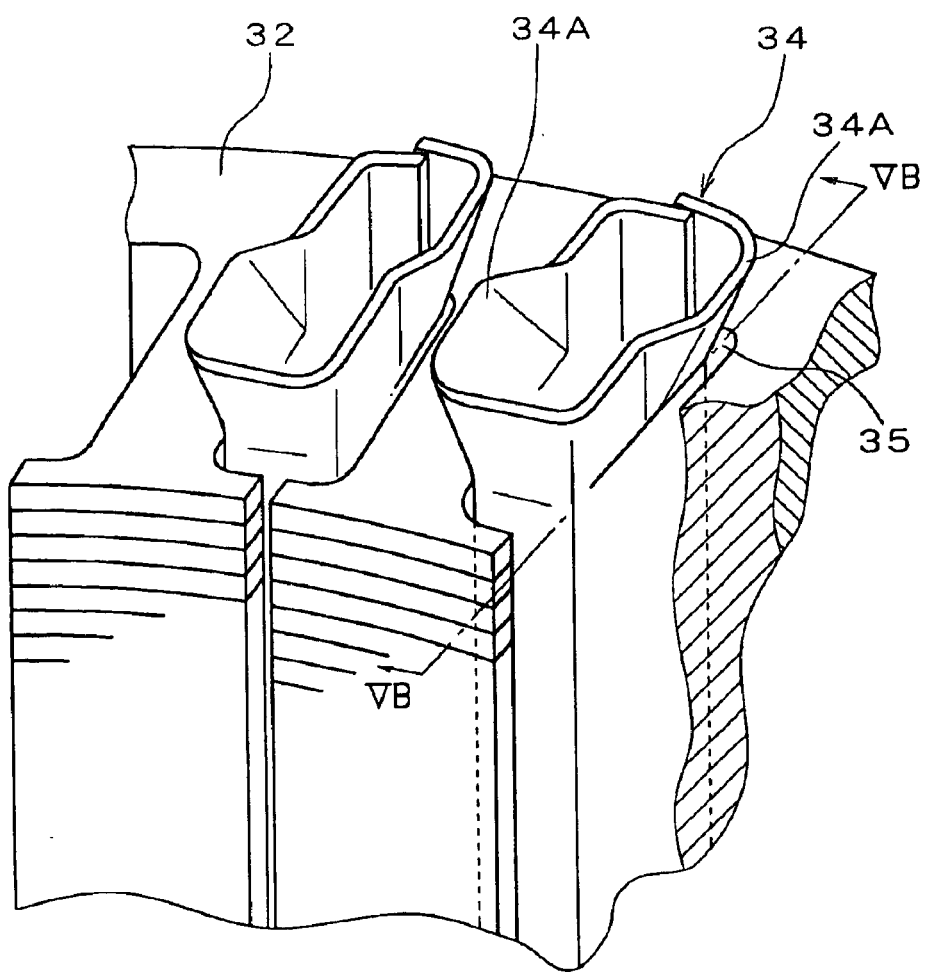
FIG. 5A is a partial perspective view of a stator core for showing the shape of insulators arranged in slots of the stator core according to the embodiment of the present invention.
Figure 5B:
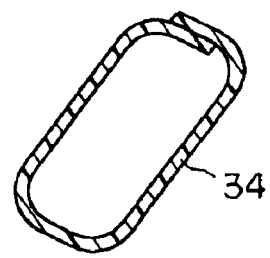
FIG. 5B is a cross-sectional view of the insulator shown in FIG. 5A taken along a line VB—VB.
Figure 6:
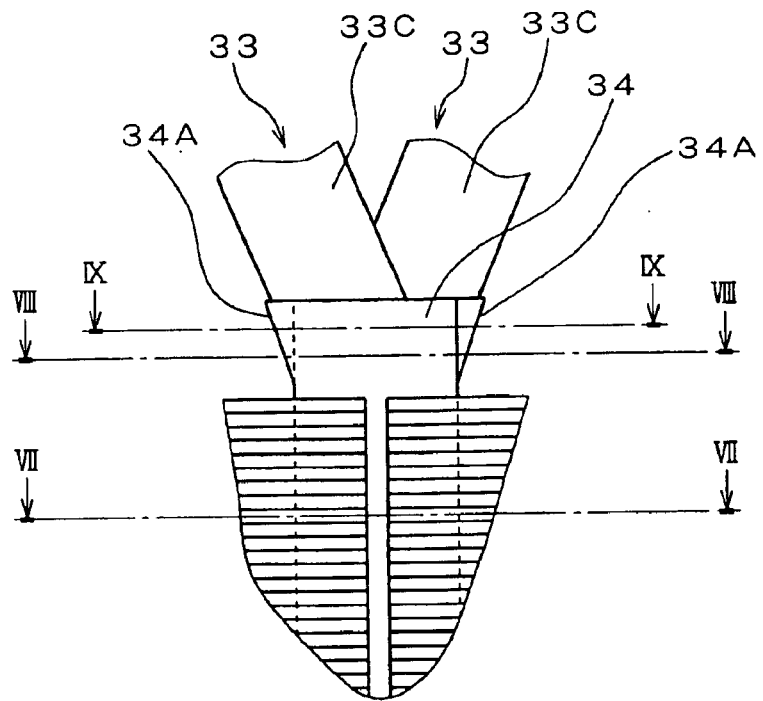
FIG. 6 is a partial side view of the stator, when viewed from a radial inside of the stator, according to the embodiment of the present invention.

Furthermore, as shown in FIGS. 3 and 5A, the insulator 34 is held in each slot 35 with the slot inside portions 33A. Also, the insulator 34 partly protrudes to the axial outside of the slot 35 to provide electrical insulation between the conductor segment 33 and the stator core 32 outside the stator core 32. As shown in FIG. 5B, the insulator 34 surrounds two slot inside portions 33A in a form of loop or ring in the slot 35.

Figure 8:
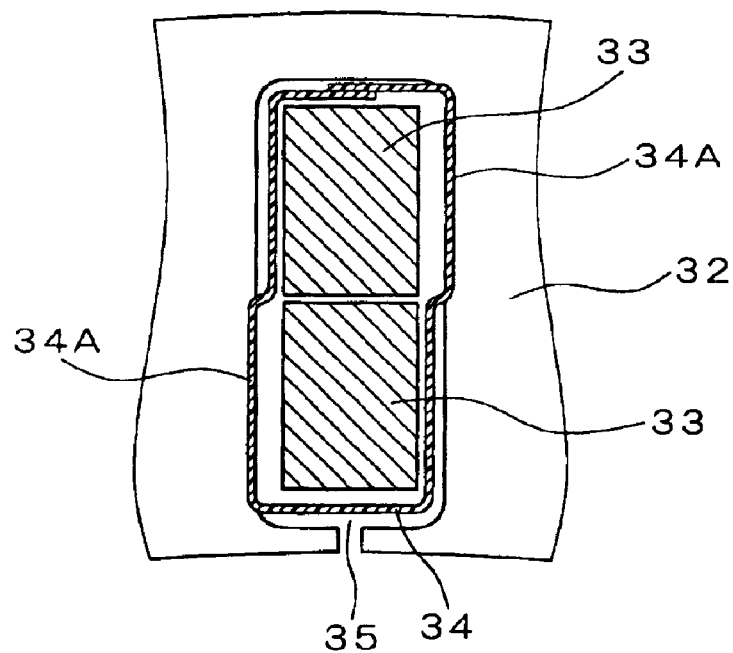
FIG. 8 is a cross-sectional view of the stator shown in FIG. 6 taken along a line VIII—VIII.
Figure 9:
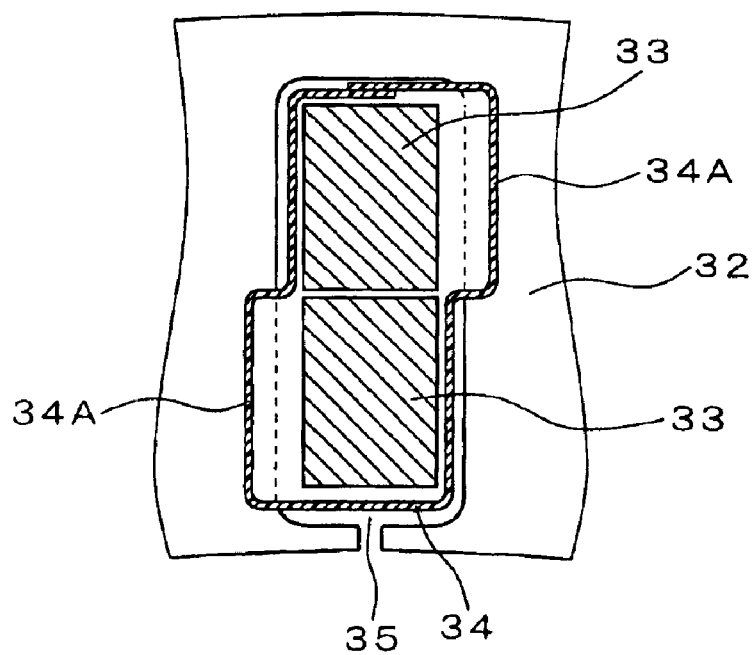
FIG. 9 is a cross-sectional view of the stator shown in FIG. 6 taken along a line IX—IX.
Figure 10:
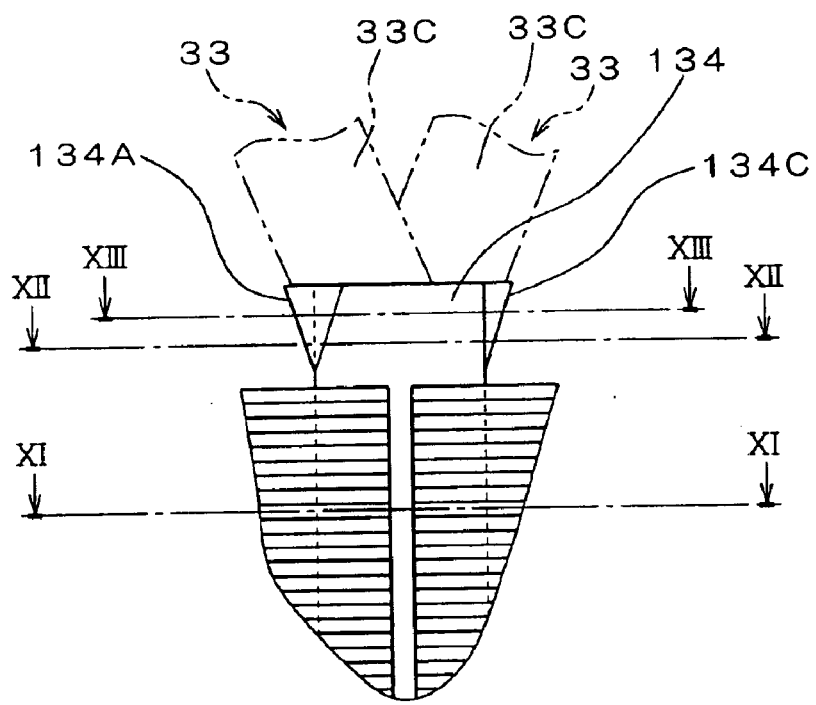
FIG. 10 is a partial side view of the stator, when viewed from the radial inside of the stator, according to a modified embodiment of the present invention.

The axial end of the insulator 34, which is located axially outside of the slot 35, forms deformed portions 34A each having the shape corresponding to the bent shape of the slot outside portions 33B, 33C. The deformed portion 34A is a form of protrusion protruding outside of the loop shape but still surrounding the slot outside portions 33B, 33C. A protruding amount of the deformed portion 34A is increased in the circumferential direction with a distance from the axial end surface of the stator core 32, as shown in FIGS. 8 and 9.

As shown in FIGS. 3 and 5A, two slot outside portions 33C (33B) of the conductor segments 33, which are held in one slot 35 and adjacent in the radial direction, are bend in the opposite direction from each other with respect to the circumferential direction. The axial end of the insulator 34 forms a plural number of deformed portions 34A to correspond to the slot outside portions 33C (33B). In the embodiment, two deformed portions 34A are formed at each axial end of the insulator 34. Two deformed portions 34A are formed on the opposite sides of the axial end of the insulator 34 to correspond to the respective slot outside portion 33C (33B) bent in the circumferentially opposite direction, the side facing the circumferential direction.

In this embodiment, the deformed portions 34A having the shape corresponding to the bent shape of the slot outside portions 33B (33C) are previously formed in the insulator 34. Therefore, it is less likely that the insulator 34 will be torn when the slot outside portions 33B, 33C are bent, even if the axial end of the insulator 34 is expanded in the circumferential direction. Furthermore, it is less likely that the conductor segments 33 and the stator core 32 will come close to each other and be shorted. Accordingly, the electrical insulation between the stator winding 31 and the stator core 32 are maintained. Further, abnormal power generation due to electrical shorting between the stator winding 31 and the stator core 32 is reduced. Also, deterioration of environmental resistance is reduced.

Further, the deformed portions 34A are formed at the circumferential sides of the insulator 34 to correspond to the slot outside portions 33B, 33C bent in the circumferential direction. Therefore, it is less likely that the insulator 34 will be torn or broken by bending the conductor segments 33 in the circumferential direction. Furthermore, it is less likely that the insulating coating of the conductor segment 33 will be torn or broken.

In addition, the deformed portion 34A is shaped to protrude outside of the looped shape of the insulator 34. Therefore, the conductor segment 33 is surrounded by the insulator 34 even after bending. Accordingly, it is less likely that the conductor segment 33 will partly or locally come close to the stator core 32.

Further, the amount of protrusion of the deformed portion 34A is increased with the distance from the axial end surface of the stator core 32. Since the deformed portion 34A is shaped to correspond to the bent shape of the conductor segment 33, it is less likely that the end of the insulator 34 will be forcibly expanded.

The deformed portion 34A is formed to correspond to each slot outside portion 33B, 33C. Therefore, it is less likely that the insulator 34 will be torn or broken by being expanded at the both circumferential sides in the circumferential direction when the slot outside portions 33B, 33C adjacent in the radial direction are bent in the opposite circumferential direction.

The present invention is not limited to the above embodiments, but may be implemented in other ways without departing from the spirit of the invention.

Figure 11:
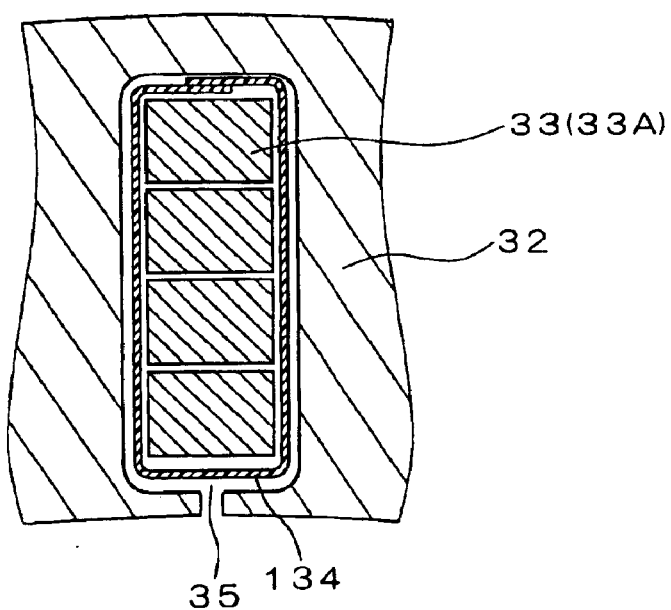
FIG. 11 is a cross-sectional view of the stator shown in FIG. 10 taken along a line XI—XI.
Figure 12:
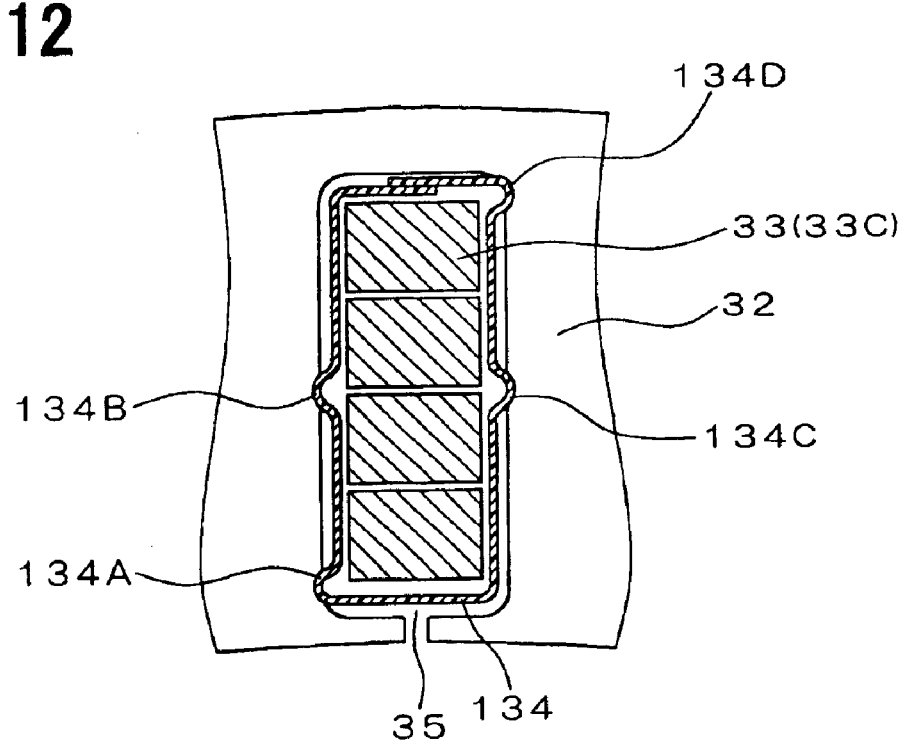
FIG. 12 is a cross-sectional view of the stator shown in FIG. 10 taken along a line XII—XII.
Figure 13:
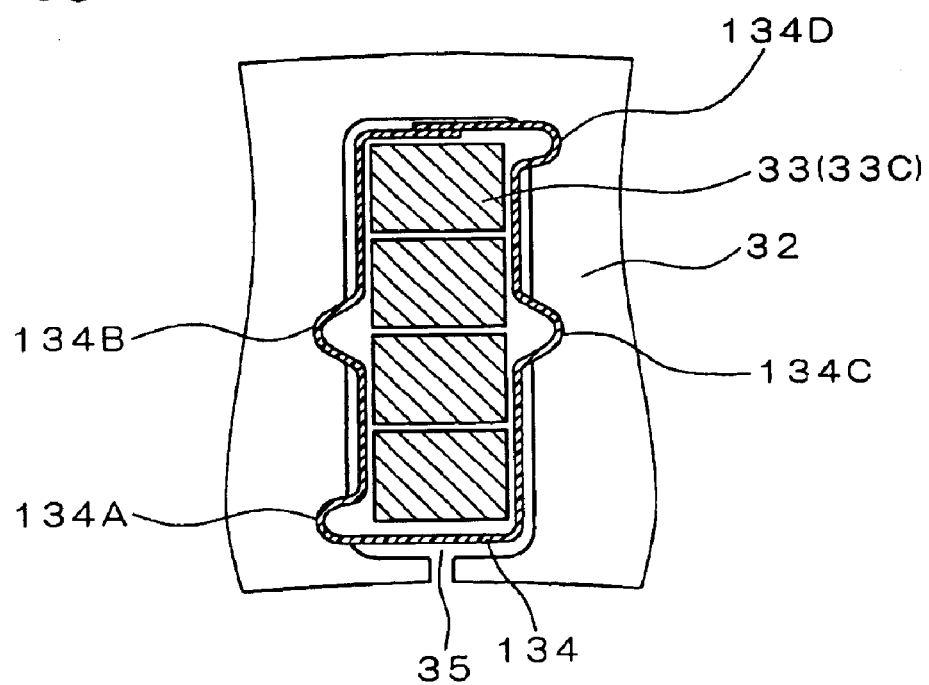
FIG. 13 is a cross-sectional view of the stator shown in FIG. 10 taken along a line XIII—XIII.
Figure 14:
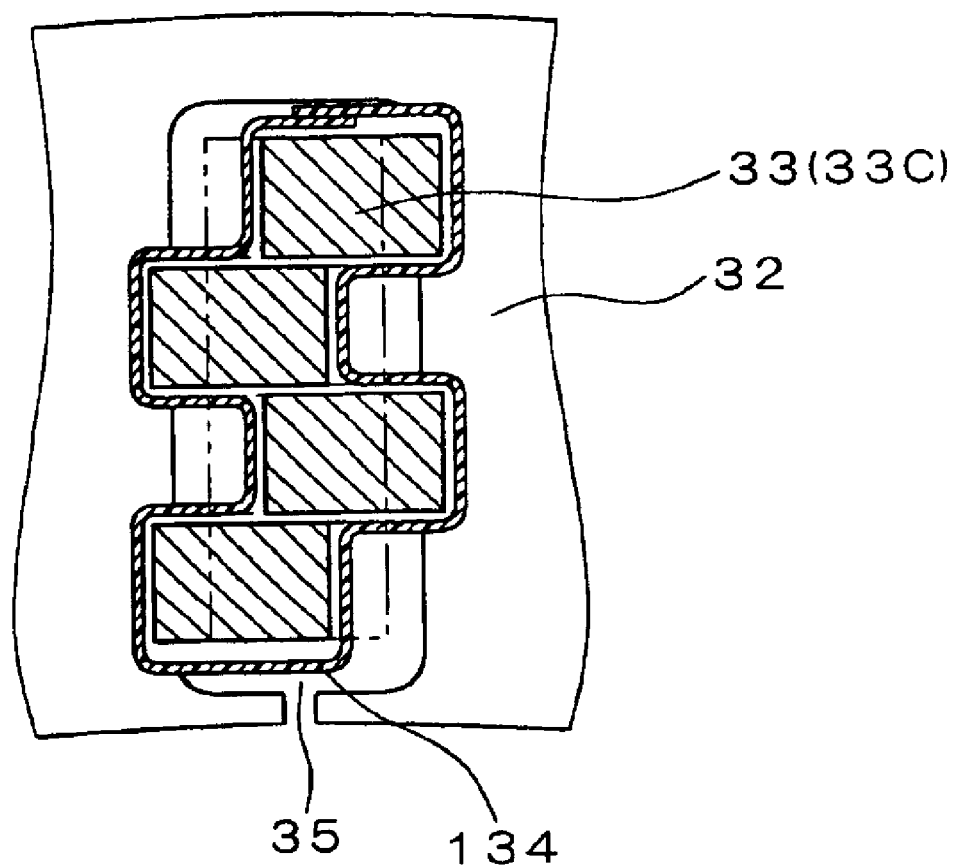
FIG. 14 is a cross-sectional view of the stator shown in FIG. 13 after the conductor segments are bend.

In the above embodiment, the insulator 34 in which the deformed portions 34A having the shape corresponding to the bent shape of the slot outside portions 33B, 33C are previously formed are used. Instead, an insulator 134 having deformed portion 134C that is easily deformable when contacting the slot outside portion 33B, 33C are bent and contact the insulator 134 can be used, as shown in FIGS. 10 to 15B. In FIGS. 11 to 13, the insulator 134 before the conductor segments 33 are bent is illustrated in cross-section. In FIG. 14, the insulator 134 after the conductor segments 33 are bent is illustrated in a cross-section.

As shown in FIG. 11 to 15B, four slot inside portions 33A are held in the slot 35, for example. Here, each slot inside portion 33A is grasped as a single electric conductor. Specifically, in one slot 35, four slot inside portion 33A are arranged in a row and form an inner end layer, an inner middle layer, an outer middle layer and an outer end layer in a radial outward direction. The insulator 134 are provided between the inner wall of the slot 35 and the slot inside portions 33A. The insulator 134 surrounds the four slot inside portions 33A along the inner wall of the slot 35.

Figure 15A:
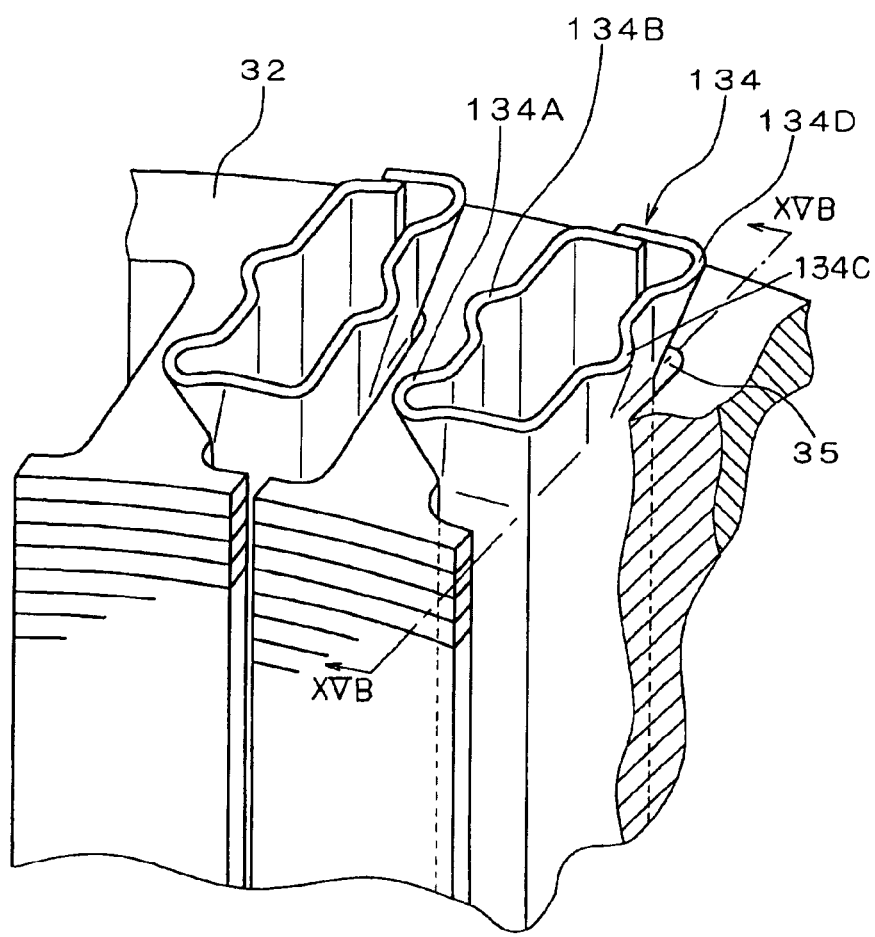
FIG. 15A is a partial perspective view of a stator core in which insulators are mounted according to the modified embodiment of the present invention.
Figure 15B:
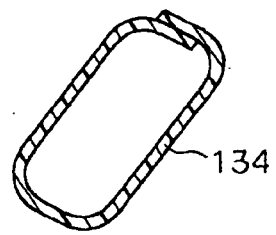
FIG. 15B is a cross-sectional view of the insulator shown in FIG. 15A taken along a line XVB—XVB.

The insulator 134 is held in the stator core 32 with the slot inside portions 33A of the conductor segments 33 and the part of the insulator 134 is located at the axial outside of the slot 35 to provide electrical insulation between the conductor segments 33 and the stator core 32. In the slot 35, the insulator 134 is arranged to have a loop shaped cross-section as shown in FIG. 15B.

The axial end of the insulator 134 forms deformed portions 134A, 134B, 134C, 134D that are easily deformable/deformed in the circumferential direction when the slot outside portions 33B, 33C are bent in the circumferential direction and contact the insulator 134. The deformed portions 134A, 134B, 134C, and 134D are formed at positions corresponding to the peripheries of the slot outside portions 33B, 33C. The deformed portions 134A, 134B, 134C and 134D are in forms of protrusions. The amount of protrusion is increased in the circumferential direction of the stator core 32 with the distance from the axial end surface of the stator core 32, as shown in FIGS. 12 and 13.

The four slot outside portions 33C (33B) that are adjacent in the radial direction in one slot 35 are bent alternately opposite circumferential directions. As shown in FIGS. 13 and 14, which illustrate the deformed portions before and after bending the slot outside portions 33C (33B), four deformed portions 134A, 134B, 134C, 134D are formed at the end of each insulator 134. At least, each deformed portion corresponds to one slot outside portion 33C (33B).

Accordingly, even when the insulator 134 are expanded in the circumferential direction by bending the slot outside portions 33C in the circumferential direction, the deformed portions 134A, 134B, 134C, 134D are deformed in the circumferential direction, thereby absorbing the expansion of the insulator 134. Therefore, it is less likely that the axial end of the insulator 134 will be torn and the conductor segments 33 will be shorted with the stator core 32. Accordingly, the electrical insulation between the stator winding 31 and the stator core 32 are maintained. Further, abnormal power generation due to electrical shorting between the stator winding 31 and the stator core 32 is reduced. Also, deterioration of environmental resistance is reduced.

In the above embodiments, the present invention is employed to the stator of the vehicle ac generator 1. Further, the present invention can be employed to a stator of a rotary electric machine other than the vehicle ac generator.

What is claimed is:

1. A stator of a rotary electric machine, comprising:
   a stator core forming a plurality of slots;
   a stator winding wound around the stator core, wherein the stator winding is constructed of conductor segments, each of the conductor segments includes a turn portion and a pair of straight portions that have a slot inside portion held in the slot and a slot outside portion extending from the slot inside portion, and the slot outside portion of the straight portions is located outside of the slot and bent in a circumferential direction of the stator core with a distance from the slot; and
   an electrical insulating member held between an inner wall defining the slot and the conductor segments in the slot, wherein a part of the insulating member is located outside of an axial end of the stator core and forms a deformed portion that is deformable when the slot outside portion of the straight portion is bent and contacts the insulating member.

2. The stator according to claim 1, wherein
   the deformed portion is formed at a side of the part of the insulating member, the side facing the circumferential direction.

3. The stator according to claim 1, wherein the deformed portion is formed at a position corresponding to the slot outside portion.

4. The stator according to claim 1, wherein
   the insulating member is arranged in a form of loop to surround the conductor segments in the slot, and
   the deformed portion is in a form of protrusion protruding to an outside of the loop shape of the insulating member.

5. The stator according to claim 4, wherein
   the deformed portion is formed such that a protruding amount of the protrusion is increased with a distance from an axial end surface of the stator core.

6. The stator according to claim 4, wherein
   the conductor segments are arranged in row in a radial direction of the stator core in each slot,
   the slot outside portions of the conductor segments are alternately bent in opposite circumferential direction, and
   the deformed portion is formed to correspond to each slot outside portion.

7. A stator of a rotary electric machine, comprising:
   a stator core forming a plurality of slots;
   a stator winding wound around the stator core, wherein the stator winding is constructed of conductor segments, each of the conductor segments includes a turn portion and a pair of straight portions that have a slot inside portion held in the slot and a slot outside portion extending from the slot inside portion, and the slot outside portion of the straight portions is located outside of the slot and bent in a circumferential direction of the stator core with a distance from the slot; and an electrical insulating member held between an inner wall defining the slot and the conductor segments in the slot, wherein a part of the insulating member is located outside of an axial end of the stator core and forms a deformed portion having a shape corresponding to a bent shape of the slot outside portion of the straight portions.

8. The stator according to claim 7, wherein the deformed portion is formed at a side of the part of the insulating member, the side facing the circumferential direction.

9. The stator according to claim 7, wherein the deformed portion is formed at a position corresponding to the slot outside portion.

10. The stator according to claim 7, wherein the insulating member is arranged in a form of loop to surround the conductor segments in the slot, and the deformed portion is in a form of protrusion protruding to an outside of the loop shape of the insulating member.

11. The stator according to claim 10, wherein the deformed portion is formed such that a protruding amount of the protrusion is increased with a distance from an axial end surface of the stator core.

12. The stator according to claim 10, wherein the conductor segments are arranged in row in a radial direction of the stator core in each slot, the slot outside portions of the conductor segments are alternately bent in opposite circumferential direction, and the deformed portion is formed to correspond to each slot outside portion.

* * * * *